G. C. PORT.
COOKING UTENSIL.
APPLICATION FILED JAN. 14, 1908.
930,223.
Patented Aug. 3, 1909.
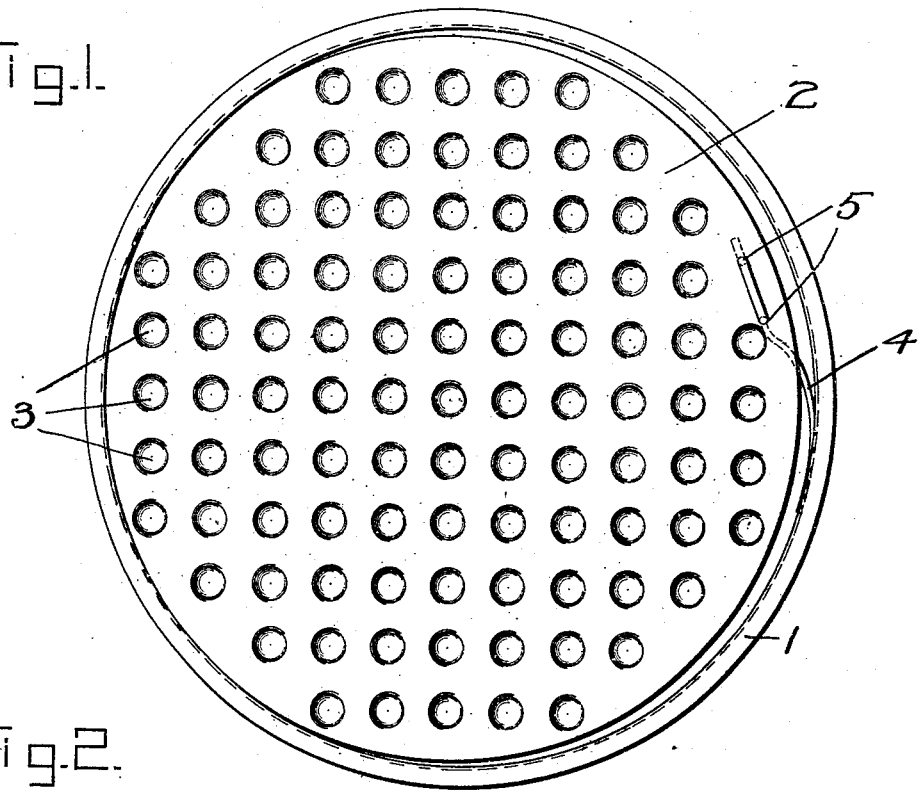
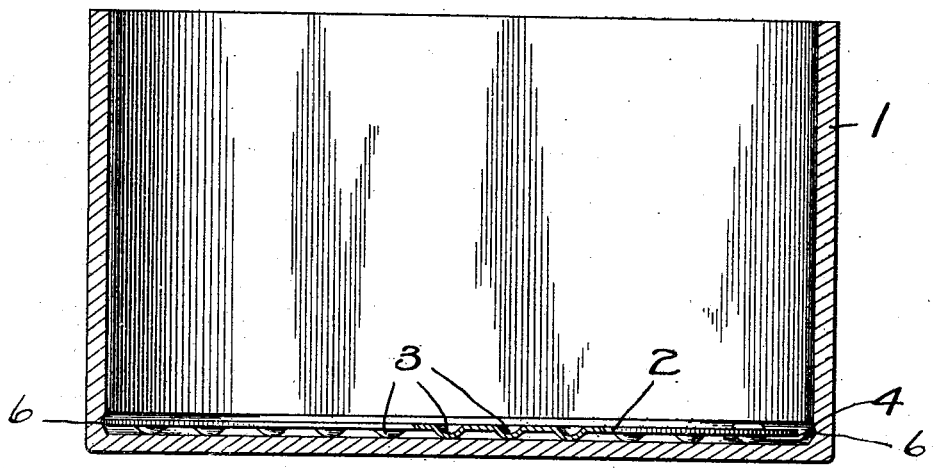
Witnesses
J. C. Miller
M. C. Bowling
Inventor
G. C. Port.
By D. Swift & Co.
Attorneys

UNITED STATES PATENT OFFICE.

GEORGE CALVIN PORT, OF EBENSBURG, PENNSYLVANIA.

COOKING UTENSIL.

No. 930,223.      Specification of Letters Patent.      Patented Aug. 3, 1909.

Application filed January 14, 1908. Serial No. 410,852.

*To all whom it may concern:*

Be it known that I, GEORGE CALVIN PORT, a citizen of the United States, residing at Ebensburg, in the county of Cambria and State of Pennsylvania, have invented a new and useful Cooking Utensil; and I do hereby declare the following to be a full, clear, and exact description of the invention, such as will enable others skilled in the art to which it appertains to make and use the same.

The invention relates to improvement in cooking utensils and has for its object to provide an exceedingly simple, inexpensive and durable device of this character adapted to cook meats and vegetables.

The essential object of the invention is to provide a device of this character consisting of a cooking utensil having an indented inner bottom, which is designed to hold the food into a space from the bottom of the cooking utensil. It is well known that food is often burned and spoiled when being boiled by reason of its resting on the bottom of the cooking utensil with nothing but the thin wall of said utensil to separate it from the fire. By the use of this invention, it will be seen that this evil will be remedied. As the food sticking to the cooking utensil is very hard to clean off of the same it will be seen that this trouble will be avoided as the cleansing of the false bottom is very easily accomplished.

With these and other objects in view, the invention consists of the novel construction and arrangement of parts hereinafter described and shown and particularly pointed out in the appended claims.

In the drawing, Figure 1 is a plan view of an inner bottom of a cooking utensil constructed in accordance with this invention. Fig. 2 is a transverse sectional view taken through the bottom of the cooking utensil, embodying this invention.

Referring to the drawings, 1 designates an ordinary cooking utensil having a removable bottom 2 which is provided with indentations 3 designed to hold the inner removable bottom spaced from the cooking utensil so that the foods being cooked in said utensil, instead of resting upon the bottom of said utensil, whereby they are often burned, will be held a safe distance therefrom. The bottom 2 is provided with a pair of apertures 5 in which is mounted, in an approximately horizontal position, a spring arm 4.

As clearly shown in the drawings, the spring arm 4 presses against one side of the utensil and frictionally engages the same, thereby forcing the inner bottom into frictional engagement with the opposite side of said utensil, by which it will be seen that said bottom will be held against accidental displacement while the contents of the utensil are being boiled.

The side wall of the utensil 1 is provided with a groove 6 by which the bottom may be more securely held in position, but it will be readily seen that the inner bottom 2 and the spring arm 4 are adapted to be used in cooking utensils of the ordinary construction.

What is claimed is,

A removable inner bottom for cooking utensils, having indentations for holding food spaced from the bottom of said utensil, said inner bottom having a pair of apertures, a spring arm mounted in said apertures, the outer end thereof being arranged to frictionally engage one side of the wall of said utensil, whereby said bottom will be forced into frictional engagement with the opposite side of said utensil, substantially as and for the purpose described.

In testimony whereof I have signed my name to this specification in the presence of two subscribing witnesses.

GEORGE CALVIN PORT.

Witnesses:
     J. F. TIBBOTT,
     CHAS. W. PORT.